Aug. 20, 1957 L. H. SOMMER 2,803,633
ORGANOSILYL SUBSTITUTED FURANS
Filed Aug. 14, 1953
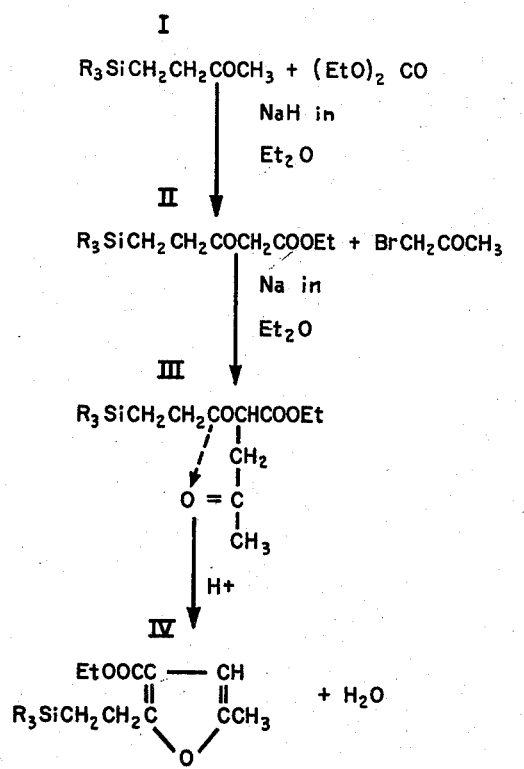
INVENTOR.
LEO H. SOMMER
BY Robert F. Fleming Jr.
ATTORNEY

United States Patent Office 2,803,633
Patented Aug. 20, 1957

2,803,633

ORGANOSILYL SUBSTITUTED FURANS

Leo H. Sommer, State College, Pa., assignor to Dow Corning Corporation, Midland, Mich., a corporation of Michigan Application August 14, 1953, Serial No. 374,315

5 Claims. (Cl. 260—347.3)

This invention relates to triorganosilyl substituted furoic acids and their esters.

It is the object of this invention to prepare novel compositions of matter which are useful as solvents for organic compounds and for organopolysiloxanes.

This invention relates to compounds of the formula

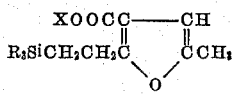

where R is a saturated aliphatic hydrocarbon or monocyclic aryl hydrocarbon radical and X is ethyl or hydrogen.

The compounds of this invention are prepared by the series of reactions shown in the accompanying drawing. Briefly, the synthesis involves the reaction of a 4-triorganosilylbutane-2-one (I) with ethyl carbonate and sodium hydride in diethyl ether. The resulting product, an ethyl delta-triorganosilyl-beta-ketovalerate (II), is condensed with bromoacetone by reacting the two with sodium in diethyl ether to produce an ethyl alpha-(beta-triorganosilylpropionyl)-levulinate (III) which is then cyclicized with the elimination of water by treating it with an acid to give an ethyl 2-(2-triorganosilylethyl)-5-methyl-3-furoate (IV). 2-(2-triorganosilylethyl)-5-methyl-3-furoic acids are prepared by refluxing compounds IV in an acid or alkaline medium under the normal conditions for hydrolyzing organic esters to the corresponding acids.

Compounds of the type I may be prepared by reacting silanes of the formula R₃SiCH₂Cl with sodium and an excess of acetoacetic ester in alcohol and thereafter hydrolyzing the resulting products with concentrated hydrochloric acid. The preparation of these compounds is fully described in United States Patent 2,635,108.

For the purpose of this invention the R groups on the silicon atom can be any saturated aliphatic hydrocarbon radical such as methyl, ethyl, octadecyl, cyclohexyl or cyclopentyl or any monocyclic aryl hydrocarbon radical such as phenyl, tolyl or xylyl. It is to be understood that all of the R groups attached to a silicon atom can be alike or each R group can be a different radical. Thus, for example, the organosilyl groups can be trimethylsilyl, ethyldibutylsilyl or phenyltolyloctadecylsilyl.

The following example is illustrative only and should not be construed as limiting the invention which is properly delineated in the appended claims.

Example 48 g. of sodium hydride and 250 ml. of dry ether were placed in a flask under a dry nitrogen sweep and 259 g. of ethyl carbonate was added rapidly. The ether was brought to reflux and 144 g. of 4-trimethylsilylbutane-2-one (Me₃SiCH₂CH₂COCH₃) in 400 ml. of dry ether was added with stirring over a period of 10 hours. The reaction mixture was stirred and refluxed overnight. 125 ml. of glacial acetic acid was added followed by 400 ml. of water. The organic layer was separated, washed with water and 10% sodium bicarbonate solution and dried over anhydrous sodium sulphate. Upon distillation of the product ethyl delta-trimethylsilyl-beta-ketovalerate (Me₃SiCH₂CH₂COCH₂COOEt)

was obtained.

To 88 g. of this ketovalerate and 300 ml. of dry ether there was added over a period of 15 minutes 9.2 g. of metallic sodium. After evolution of hydrogen had ceased, the mixture was refluxed for a short while to complete the reaction. The mixture was then cooled to 0° C. and a solution of 57.5 g. of freshly distilled bromoacetone in an equal volume of dry ether was added dropwise. The reaction mixture was warmed to room temperature and refluxed for one hour. A solution of 37 ml. of concentrated HCl in 100 ml. of water was added slowly. The ether layer was separated, dried over anhydrous sodium sulphate and the solvent was removed by distillation. There remained ethyl alpha-(beta-trimethylsilylpropionyl)-levulinate

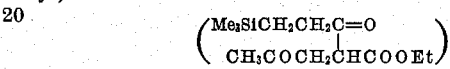

60 g. of this ethyl levulinate, 10 ml. of concentrated H₂SO₄, 150 ml. of glacial acetic acid and 20 ml. of water were mixed and refluxed for 1¼ hours. The reaction mixture was cooled and the organic layer was separated. The aqueous layer was extracted with three 100 ml. portions of ether and the combined extract and organic layers were washed with three 100 ml. portions of water and dried over anhydrous sodium sulphate. Upon distillation of the product there was obtained ethyl 2-(2-trimethylsilylethyl)-5-methyl-3-furoate

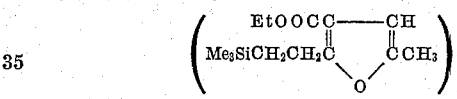

This material had the following properties: boiling point 90° C. at 2 mm. pressure, $n_D^{20}$ 1.4695, $d^{20}$ 0.9759, MR$_D$ 72.58 and molecular weight in benzene 254. Upon analysis the material was found to contain 11.3% by weight silicon.

When this ethyl furoate is refluxed with dilute sodium hydroxide and the reaction mixture is acidified with dilute HCl, the compound 2-(2-trimethylsilylethyl)-5-methyl-3-furoic acid is obtained.

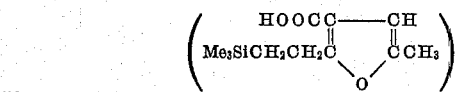

That which is claimed is:

1. A compound of the formula

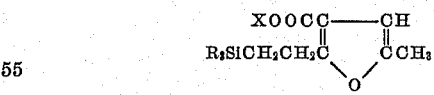

where R is selected from the group consisting of saturated aliphatic hydrocarbon and monocyclic aryl hydrocarbon radicals and X is selected from the group consisting of an ethyl radical and hydrogen.

2. A compound in accordance with claim 1 where X is ethyl.

3. A compound in accordance with claim 1 where X is hydrogen.

4. Ethyl 2 - (2 - trimethylsilylethyl) - 5 - methyl - 3 - furoate.

5. 2 - (2 - trimethylsilylethyl) - 5 - methyl - 3 - furoic acid.

References Cited in the file of this patent

Benkeser et al.: J. A. C. S. 70, 1780 (1948).